United States Patent Office 2,964,500
Patented Dec. 13, 1960

---

2,964,500

PREPARATION OF FORMALDEHYDE POLYMERS WITH IMPROVED THERMAL STABILITY

Sidney Hartman Jenkins, Jr., and John Oliver Punderson, Wilmington, Del., assignors to E. I. du Pont de Nemours and Company, Wilmington, Del., a corporation of Delaware No Drawing. Filed Sept. 29, 1958, Ser. No. 763,842

6 Claims. (Cl. 260—67)

This invention relates to a novel process for the esterification of high molecular weight formaldehyde polymers, and, more particularly, it relates to such a process employing a novel group of catalysts.

This is a continuation-in-part application of our copending application Serial No. 443,703, filed July 15, 1954.

In copending application Serial No. 681,188, filed by Dal Nogare and Punderson on August 30, 1957, there is described a new compound comprising a high molecular weight polyoxymethylene which has been esterified, and which, because of the esterification, has attained a very high degree of thermal stability. This copending application describes a process for preparing such compositions by treating a formaldehyde polymer, known as a "polyoxymethylene," with a carboxylic acid anhydride in the presence of an alkaline compound, such as secondary- or tertiary-organic amines. Although the process of this copending application is highly successful in producing the desired compound, the process has some undesirable features from an economic point of view, since the reactants are volatile, and those which have not been consumed in the process are extremly difficult to recover for recycling in the process. Furthermore, the use of amine catalysts frequently imparts a color to the treated polymer, and further steps are necessary in order to prepare a colorless product.

It has now been found that other catalysts may be used in the process of esterifying polyoxymethylenes with equal or greater success in the production of esterified polymers and with the added advantage that the catalysts of the present invention are cheap and are nonvolatile, thus permitting separation of by-products from unused reactants which can be recycled. The catalysts and the remaining anhydride may be employed over and over again. Moreover, the esterified polymer prepared by this process is colorless.

It is an object of this invention to provide a process for esterifying high molecular weight polyoxymethylenes. It is another object of this invention to provide a process for esterifying polyoxymethylene by employing a novel class of catalysts which are easily separated from the by-product acid formed in the reaction mixture. Another object of this invention is to provide a process for esterifying high molecular weight polyoxymethylenes by using minute amounts of a non-volatile catalyst. Still another object is to prepare colorless polyoxymethylene dicarboxylates. Other objects will appear from the more detailed description of this invention which follows.

The above objects are accomplished in accordance with the process of this invention by reacting polyoxymethylene having a number average molecular weight of at least 15,000, and having at least one of the two terminals of the polyoxymethylene chain occupied by a hydroxyl group, with an anhydride of a saturated, monobasic carboxylic acid in the presence of a salt whose cation is an alkali metal and whose anion is the negative ion product obtained by removing a hydrogen atom from an acid having a dissociation constant which is less than $1.8 \times 10^{-4}$ at 25° C. In the preferred embodiment of this invention a polyoxymethylene glycol having both terminals of its polymer chain occupied by hydroxyl groups and having a number average molecular weight of at least 15,000, is reacted with 2–20 parts of acetic anhydride per part of said polyoxymethylene glycol in the presence of 0.002%–10% by weight of said anhydride of an alkali metal acetate for a time sufficient to allow the terminal hydroxyl groups on the polymer to be replaced by acetate groups, thereby producing a polyoxymethylene diacetate having both terminals of its polymer chain occupied by acetate groups, having a number average molecular weight of at least 15,000, and having a reaction rate constant for thermal degradation at 222° C. of less than 1% by weight per minute. This treatment greatly improves the thermal stability of this formaldehyde polymer as evidenced by neglig.ble weight losses at high temperatures, while, at the same time, other desirable physical properties of the polymer are not impaired.

The polyoxymethylene starting material employed in the process of this invention is a polymer of recurring oxymethylene units ($-CH_2O-$), thus forming a polymer chain which is an acetal in that it is composed of a series of alternate carbon atoms and oxygen atoms ($-CH_2-O-CH_2-O---$). The acetal chain is terminated at each end by a hydroxyl group, an ether group, or an ester group. This process requires that at least one of the two terminal groups of the starting polymer is a hydroxyl group, which, in turn, is esterified to produce the final product. The structural formula of the polymeric starting material, therefore, is:

$$HO(CH_2O)_nR$$

wherein R may be hydrogen, alkyl, cycloalkyl, aryl, or acyl. If R is hydrogen, the polymer chain is then terminated at both ends by a hydroxyl group, and it is called a polyoxymethylene glycol. It is to be understood, however, that, because of the complexities of the growth mechanism of a polymer, one does not expect to be able to prepare a polymer composition in which every molecule is identical in every detail with every other molecule. It is for this reason that whenever the name of a particular polyoxymethylene is used in this description, it is to be expected that some small portion of the polymer composition may be slightly different from the main portion of the composition. For example, a polyoxymethylene glycol may contain a small amount of polymer molecules in which the polymer chain is terminated at one end with a hydroxyl group, and at the other end with an alkoxyl group or an ester group. The alkoxyl groups and the ester groups are not expected to be affected by the process of this invention, and, accordingly, the final product may have some polymer chains terminated by an alkoxyl even though the product is called a polyoxymethylene dicarboxylate.

In the description of this invention the property of thermal stability is defined by the value of the reaction rate constant for thermal degradation at some elevated temperature. The values of the reaction rate constant in this invention have been determined at 222° C. It is well known that chemical reactions may be classed as first-order, second-order, third-order, etc., depending on the number of molecules which enter into the reaction, or are formed by the reaction. It is also known that the decomposition or degradation of a material following a first-order reaction can be expressed mathematically in the form of the differential equation:

$$-\frac{dw}{dt} = kw$$

in which $t$ is the elapsed time from the beginning of the decomposition reaction, $w$ is the weight of the material which remains undecomposed at time $t$, and $k$ is a rate constant for the equation. The thermal degradation of the formaldehyde polymers of this invention has been found, with few exceptions, to conform closely to a first-order reaction which can be expressed by the above equation. The value of $k$ in this equation is utilized in the description of this invention to characterize a polymer with respect to its thermal stability. The desirable polymers are those having a value of $k$ for a thermal degradation reaction at 222° C. ($k_{222}$) of less than 1% per minute, and preferably less than 0.5% per minute.

The value of the reaction rate constant for thermal degradation may be determined by a procedure for directly measuring the weight of polymer degraded, this procedure being described in copending application Serial No. 681,188, filed by Dal Nogare and Punderson on August 30, 1957. As reported herein, however, this constant has been determined by an alternate procedure which is more convenient to employ in that it consumes less time, and the values obtained by this method and by the method described in the copending application closely approximate each other and, in many cases, are identical. In the procedure followed herein a known weight of the polymer is heated in a vapor bath at 222° C. and the volume of gas which evolves from the degrading polymer is observed over a given time interval; the reaction rate constant being calculated from the equation given below. The reaction rate constant for thermal degradation at 222° C. is reported as $k_{222}$ and has units of weight percent of the polymer, which degrades per minute. The equation which is used to calculate this constant is $$k_{222} \text{ (percent/min.)} = \frac{\text{(volume of gas in cc. evolved in time } t\text{)} \times (0.0736)}{\text{(time } t \text{ in minutes)} \times \text{(initial weight of polymer sample in gms.)}}$$

The factor 0.0736 is a constant which is calculated on the assumption that all of the evolved gas is formaldehyde and that it behaves as an ideal gas.

A preferred method of determining the volume of gas evolved, which may in turn be used in the above equation, is to place a small weighed sample of polymer which is to be tested in a hypodermic syringe of about 50 cc. volume. The syringe containing the polymer is then placed in a vapor bath at a temperature of 222° C., which may be obtained by utilizing vapors of methyl salicylate which boils at 222° C. and recording the volume of vapor which is evolved in the period between 10 and 20 minutes residence time in the vapor bath. In the preferred operation of this test, polymer in the form of a small pressed pellet is weighed to the nearest 0.01 gram, placed in a well cleaned syringe, which is sealed between the plunger and the cylinder with a high quality lubricating fluid such as a silicone oil. In order to remove oxygen, the syringe is flushed out with nitrogen several times, following which the lubricating fluid is drawn into the syringe causing the nitrogen to be displaced and leaving the polymer pellet immersed in a small quantity of the lubricating fluid. The nozzle of the syringe is then sealed, the syringe is suspended in a bath of methyl salicylate vapors, and the volume of decomposition vapors evolved is recorded by noting the position of the syringe cylinder both at 10 minutes and 20 minutes after placing the syringe in the vapor bath. If the gas evolution is plotted against time throughout the period of heating, it may be observed that the shape of the curve does not conform strictly to that which is predicted by first-order kinetics. The reason for this behavior is not fully understood, but it has been found experimentally that this test gives reasonably reproducible results which are very useful in comparing the thermal stabilities of high molecular weight polymers of formaldehyde. In addition, the numerical values obtained from this test are sufficiently close to those obtained from the more time-consuming procedure described in copending application Serial No. 681,188, filed by Dal Nogare and Punderson on August 20, 1957, that the results of the two tests can be considered approximately equivalent for the purpose of demonstrating improved thermal stability by the practice of this invention.

In the following examples percentages and parts are by weight, and the reaction constant $k_{222}$ is measured as described above.

EXAMPLES 1 to 20

Into a reaction vessel there is placed 25 grams of a high molecular weight polyoxymethylene, 300 ml. of acetic anhydride and the indicated amount of catalyst. This mixture is stirred and heated under refluxing conditions (about 139° C.) for approximately 1 hour. The reaction mixture is then cooled and the product filtered. The filter cake is then washed onced with a 250 ml. portion of acetone and three times or more with 250 ml. portions of distilled water. The washed filter cake is then reslurried in a high speed blender with water followed by filtering and washed once with a 250 ml. portion of water and then a 250 ml. portion of acetone. The indicated antioxidant is then incorporated into the polymer by washing the polymer with 200 ml. of acetone containing 0.135 gram of the antioxidant. The treated polymer is then dried in a vacuum oven for 4 hours at 65° C. and the resulting polymer is weighed to determine the recovery percentage and the poymer is tested to determine the reaction rate constant $k_{222}$ which is reported in Table I. Those examples showing a $k_{222}$ of "greater than 0.5%/min." are in most cases considered to have been not completely esterified by the process of this invention. At times, however, it may be found that completely esterified polymers give $k_{222}$ values greater than 0.5%/min. if they have not been properly washed and dried following the esterification reaction, in order to remove impurities which may accelerate the degradation of the esterified polymer. High polymer recovery is a good indication of rapid esterification in these examples, because the esterified polymer is more stable in the reaction medium than the unesterified polymer. Thus, effective catalysts generally give polymer recoveries of 90% or greater while no catalyst or ineffective catalysts give polymer recoveries less than 90%. The product polymers of these examples have substantially the same number average molecular weight as the starting polymer; in other words, the esterification reaction does not noticeably degrade the polymer.

Table I

| Example | Number Average Molecular Weight of Polymer Starting Material | Grams of Catalyst Per 100 ml. of Anhydride | Antioxidant | Polymer Recovery in Weight percent | $k_{222}$, percent min. |
|---|---|---|---|---|---|
| 1 | 75,000 | 0.04 sodium acetate | di-beta-naphthyl-p-phenylenediamine. | 99 | 0.18. |
| 2 | 42,000 | 0.01 sodium acetate | beta-conidendrol [1] | 96 | 0.23. |
| 3 | 55,000 | 0.003 sodium acetate | di-beta-naphthyl-p-phenylenediamine. | 94 | 0.24. |
| 4 | 55,000 | 0.001 sodium acetate | ......do............ | 91 | greater than 0.5. |
| 5 | 50,000 | 10 sodium acetate | ......do............ | 96 | .19. |
| 6 | 50,000 | none | ......do............ | 84–88 | greater than 0.5. |
| 7 | 50,000 | 10 sodium benzoate | ......do............ | 96 | 0.16. |
| 8 | 50,000 | 10 disodium phosphate | ......do............ | 96 | 0.09. |
| 9 | 50,000 | 2 calcium stearate | ......do............ | 85 | greater than 0.5. |
| 10 | 50,000 | 2 sodium stearate | ......do............ | 100 | 0.16. |
| 11 | 50,000 | 0.2 sodium stearate | ......do............ | 96 | 0.34. |
| 12 | 55,000 | 0.08 sodium formate | ......do............ | 98 | 0.30. |
| 13 | 55,000 | 0.2 calcium acetate | ......do............ | 79 | greater than 0.5. |
| 14 | 55,000 | 0.065 sodium carbonate | ......do............ | 98 | 0.020. |
| 15 | 55,000 | 0.049 sodium hydroxide | ......do............ | 96 | 0.21. |
| 16 | 37,000 | 0.1 sodium sulfite | beta-conidendrol [1] | 94 | greater than 0.5. |
| 17 | 37,000 | 0.012 potassium acetate | ......do............ | 96 | 0.05. |
| 18 | 37,000 | 0.048 potassium acetate | ......do............ | 96 | 0.16. |
| 19 | 55,000 | 1 lithium acetate | di-beta-naphthyl-p-phenylenediamine. | 95 | 0.14. |
| 20 | 55,000 | 0.1 lithium acetate | ......do............ | 93 | 0.16. |

[1] Beta-conidendrol is 1, 2, 3, 4-tetrahydro-6, 7-dihydroxy-4-(3, 4-dihydroxylphenyl)-3-(hydroxymethyl)-2-naphthoic acid-gamma-lactone.

EXAMPLE 21

Into a reaction vessel there is placed 500 grams of a polyoxymethylene having a number average molecular weight of 40,000, 4 liters of acetic anhydride, and 1.6 grams of anhydrous sodium acetate. The mixture is stirred and heated to 160° C. Nitrogen gas, at 12 to 15 pounds per square inch gauge pressure, is maintained in the space above the reaction mixture during the heating period to prevent boiling. The polymer is completely dissolved in the reaction mixture at this temperature. The mixture is allowed to cool slowly with stirring, and the polymer precipitates from the solution at about 133° C., the total time in solution being about 90 minutes. The acetylated polymer is removed by filtration and washed on the filter with 3 liters of acetone. It is then reslurried in 3 liters of water using high speed agitation and the slurry is filtered again. The water washing is repeated two more times. It is then washed once with 3 liters of acetone and finally with 3 liters of acetone containing 2.0 grams of beta-conidendrol. The product is dried in a vacuum oven at 65° C. The polymer recovery is 94%, and the $k_{222}$ value is 0.09%/min. After suitable compacting, the product is injection molded into colorless molded articles of excellent strength and toughness.

EXAMPLE 22

The procedure of Example 21 is repeated with a polyoxymethylene having a number average molecular weight of 50,000, with two exceptions: (1) that the acetylation catalyst is 1.92 grams of potassium acetate in place of the 1.6 grams of sodium acetate, and (2) that the washing procedure following the acetylation consists of several washings with 3 liter quantities of acetone followed by a final washing with 3 liters of acetone containing 2.0 grams of beta-conidendrol. After drying, the polymer recovery is 94% and the $k_{222}$ value was 0.07%/min.

EXAMPLE 23

A mixture of 500 grams of polyoxymethylene, having a number average molecular weight of 37,000, 4 liters of acetic anhydride, and 1.6 grams of anhydrous sodium acetate is stirred and heated under reflux at about 139° C. for 1 hour. After cooling, the polymer is removed from the reaction mixture by filtration. The filter cake is reslurried with high speed stirring using 3 liters of acetic acid as the washing solvent. The polymer is again recovered by filtration and is washed on the filter with 3 liters of acetic acid. The washings in acetic acid by reslurrying and filtration are repeated two more times. The product is then washed on the filter with 3 liters of acetic acid containing 2.0 grams of beta-conidendrol. The product is dried overnight in a vacuum oven at 65° C. and exhibits a $k_{222}$ value of 0.16%/min.

EXAMPLE 24

The procedure of Example 23 is repeated except that acetic anhydride is used as the washing liquid after the acetylation reaction instead of acetic acid. The polymer is dried for three days at 65° C. in a vacuum oven which removes essentially all of the residual acetic anhydride. The product is then blended with 0.5 gram of dry beta-conidendrol and is found to exhibit a $k_{222}$ value of 0.23%/min.

EXAMPLE 25

A solution is prepared by heating at reflux for two hours a mixture of 800 ml. of reagent grade acetic anhydride and 0.080 gram of anhydrous sodium acetate. This solution at 139° C. is poured rapidly into a 2-liter flask containing 40 grams of a polyoxymethylene having a number average molecular weight of 37,000 to form a slurry, which is stirred and heated under reflux at 139° C. Two minutes after the addition of the acetic anhydride solution to the polymer, a portion of about 50 ml. of the reaction mixture is rapidly withdrawn from the reaction vessel with a siphon and is quenched by adding it immediately to 50 ml. of cold acetic anhydride. Additional 50 ml. portions of the reaction mixture are withdrawn and quenched in the same manner at various times as the reaction progresses. All of the samples are worked up by filtration and washing with acetone and water similar to the method described in Examples 1 to 20. No antioxidant-type stabilizers are added, and the products are dried overnight in a vacuum oven at 65° C.

The dry polymer samples are pressed at room temperature to form films about 0.003 inch in thickness. Examination of these films by infrared spectroscopy shows a band at 5.69 microns wave-length, which is the characteristic absorption of the acetate carbonyl group.

By comparison of the spectrum of untreated polymer with the spectra of the various acetylated samples it is found that the acetylation of the polymer progresses very rapidly during the first few minutes of contact with the acetylating solution, and that the number of acetate groups introduced into the polymer quickly rises to a maximum and levels off indicating essentially complete acetylation of the available hydroxyl groups. From the relative strengths of the absorption bands at 5.69 microns wave-length, the percent completion of the acetylation reaction can be calculated.

For comparison, two additional series of runs are made which are identical in all respects with the above description except for the catalyst concentration. In one case the catalyst concentration is 0.008 gram of anhydrous sodium acetate per 800 ml. of acetic anhydride and in the other case no catalyst was included at all.

The infrared spectroscopy was accomplished on a Perkin-Elmer Model 21 Infrared Spectrophotometer fitted with a calcium fluoride prism using a slit schedule of 975. Analyses were made in the region of 2 to 8 microns wave-length, the hydroxyl band appearing at a wave-length of 2.88 microns and the acetate carbonyl band appearing at a wave-length of 5.69 microns.

The results are shown in Table II where it is indicated that when the catalyst concentration is 0.01 gram per 100 ml. of anhydride the polymer is 100% acetylated in 6 min. of reaction time; when the catalyst concentration is reduced ten-fold to 0.001 gram per 100 ml. of anhydride, the polymer is only 61% acetylated after 20 min. of reaction time; and when no catalyst is employed, the polymer is only 41% acetylated after 20 min. of reaction time and only 94% acetylated after 102 min. of reaction time.

Table II

| Reaction Time, Min. | Percent of Acetylation | | |
|---|---|---|---|
| | 0.01 Gram Sodium Acetate per 100 ml. Acetic Anhydride | 0.001 Gram Sodium Acetate per 100 ml. Acetic Anhydride | No Catalyst |
| 0 | 0 | 0 | 0 |
| 2 | 25 | 0 | 0 |
| 4 | 98 | 5 | 1.4 |
| 6 | 100 | 13 | 5 |
| 8 | 100 | 20 | 10 |
| 10 | 100 | 27 | 16 |
| 15 | 100 | 43 | 28 |
| 20 | 100 | 61 | 41 |
| 102 | | | 94 |

The process of this invention is visualized as an alternate procedure to that described in copending application Serial No. 681,188 filed by Dal Nogare and Punderson, on August 30, 1957, in that the present process is capable of esterifying high molecular weight polyoxymethylenes to form polyoxymethylene dicarboxylates which are characterized by having an extremely high degree of thermal stability. The advantages of the present process over that described in the copending application is that the esterified product polymer is essentially colorless, and that acetic acid, which is a necessary by-product of this reaction, can be separated conveniently and easily from the unused reactants, thus permitting the present process to be easily adapted to an economical continuous operation.

The starting material for this process may be any high molecular weight polyoxymethylene, or, as it is sometimes called, a linear polymer of formaldehyde, which contains a hydroxyl group or a hemiformal group, located at one end or at each end of the polymer chain, giving rise to a latent instability in the polymer. The polyoxymethylene starting material may be any of those products described in U.S. Patent 2,768,994, issued October 30, 1956, to R. N. MacDonald; U.S. Patent 2,844,561, issued July 22, 1958, to R. N. MacDonald and M. F. Bechtold; or the product of any process described in U.S. Patent 2,828,286, issued March 25, 1958, and in U.S. Patent 2,841,570, issued July 1, 1958, both issued to R. N. MacDonald, and in U.S. Patent 2,848,437, issued August 19, 1958, to W. P. Langsdorf and G. S. Stamatoff. Other forms of polymeric formaldehyde that are thermally unstable by reason of the presence of terminal hydroxyl groups, may be chemically modified by the process of this invention to prepare products that have an improved thermal stability, although only the high molecular weight polymers are useful in the plastics industry.

In general, any anhydride of a saturated, monobasic carboxylic acid is operable in this invention, although the anhydrides of saturated, monobasic, aliphatic, carboxylic acids of 1–10 carbon atoms are preferred. Thus, anhydrides of carboxylic acids which are unsaturated, e.g. acrylic acid, or dibasic, e.g. adipic acid and lactic acid, are not intended to be included within this invention. The acid may be substituted by inert groups such as alkoxy or halogen, but may not have more than one replaceable hydrogen, or, in other words, must be monobasic. Included among the anhydrides which may be employed in this invention are the anhydrides of aliphatic carboxylic acids, such as acetic, propionic, butyric, caproic, decanoic, and stearic; of cycloaliphatic carboxylic acids, such as cyclohexanecarboxylic; of aromatic carboxylic acids, such as benzoic acid; and the mixed anhydrides of the above acids, such as acetic propionic anhydride. The preferred anhydride is acetic anhydride, because of its availability and low cost.

It is preferable that the anhydride used in the process of this invention be of reasonably high purity in order that optimum results be obtained. It is well known to those skilled in the art that acetic anhydride usually contains some traces of acetic acid and may contain large quantities of acetic acid, if the anhydride is exposed to the moisture of the atmosphere for some time. The same observations are, of course, applicable to other anhydrides operable in this invention and to the corresponding acids. In the examples cited above, reagent grade acetic anhydride was used in which the acetic acid concentration was found by analysis to be less than 1%. A high grade commercial acetic anhydride has also been found to give good results. Although the process is operable for the purpose of acetylating polyoxymethylene in the presence of relatively large concentrations of acetic acid, some polymer loss due to degradation is incurred by this method of operation, so that it is generally preferred for economic reasons to operate in the presence of relatively small concentrations of acetic acid or other carboxylic acid corresponding to the anhydride being used. The degradation is such that if the procedure of Examples 1 to 20 were followed employing 0.1 gram of sodium acetate per 100 ml. of acetic anhydride, the polymer recovery would be 98% if less than 1% of acetic acid were present in the anhydride. The recovery would drop to 84% if there were 4% acetic acid present, and the recovery would fall to 56% if there were 10% acetic acid present in the anhydride. In a continuous process by-product acetic acid can readily be removed from acetic anhydride and the catalyst by distilling out acetic acid before re-using the acetylating solution.

The catalyst used in the process of this invention is defined as being a salt whose cation is an alkali metal and whose anion is the negative ion product obtained by removing a hydrogen atom from an acid having a dissociation constant which is less than $1.8 \times 10^{-4}$ at 25° C. as normally determined in an aqueous medium. The cation, therefore, includes lithium, sodium, potassium, rubidium, and cesium. The anion may be determined from any standard chemical handbook and includes the formate ion, the stearate ion, the carbonate ion, the benzoate ion, the sulfite ion, the divalent phosphate ion, the acetate ion and others well known to those skilled in the art. Therefore, salts which are operable as the catalyst in the process of this invention include sodium acetate, lithium acetate, potassium acetate, sodium formate, sodium benzoate, sodium carbonate, disodium phosphate, sodium stearate and many others which will be apparent by combining the indicated cations and anions.

It is not intended that the process of this invention be limited to a step of adding to the reaction one of the identified salts as a catalyst since the catalytic salt may be formed in situ by a reaction between acetic anhydride or acetic acid and an appropriate base. For instance, in Example 15 sodium hydroxide is added to the reaction medium and forms sodium acetate in situ which in turn acts as the catalyst of this process. In a like manner, any other alkali metal hydroxide might be used in place of sodium hydroxide.

Some acids, such as phosphoric or sulfuric acid, have more than 1 hydrogen which may be removed by dissociation, the constant for removal of the first hydrogen being higher than the constant for removal of the second and succeeding hydrogens. In such a case, if the dissociation constant for removal of the second or third hydrogens is less than $1.8 \times 10^{-4}$, it is intended that the remaining anion be included among those claimed in the process of this invention. For example, phosphoric acid has a dissociation constant of $1.1 \times 10^{-2}$ for the first hydrogen and $7.5 \times 10^{-8}$ for the second hydrogen, and, accordingly, monosodium phosphate is not included as a possible catalyst in this invention while disodium phosphate is included as a catalyst in this invention. The choice of other similar salts derived from acids having more than 1 hydrogen atom will be apparent to those skilled in the art by an inspection of published tables showing dissociation constants of acids, or by the determination of such constants by standard methods.

The process conditions for accomplishing esterification of polyoxymethylenes are not restrictive, but, on the contrary, a wide variety of conditions may be used in different embodiments of this process. For example, the reaction medium may be acetic anhydride or any other anhydride used as a reactant in this process. As an alternative procedure, the reaction medium may be a non-degrading solvent for the polymer or an inert hydrocarbon capable of forming a slurry with particles of the polymer.

The temperature and duration of the esterification process are not critical. If the temperature used is above the boiling point of the reaction mixture, pressure vessels will be required to prevent the liquids in the reaction medium from vaporizing. The duration of the reaction is not limited by any peculiarities other than the normal requirements of allowing sufficient time for the reaction to occur and to approach as near as possible the completion of the reaction. This time may be a few minutes or it may be two or three hours depending on the temperature of the reaction, concentration of the reactants, and other factors well understood by those skilled in the art. In general, temperatures of 50° C. to 200° C. combined with reaction times of five minutes to about three hours are sufficient to encompass the normal processes of this invention. It may be advantageous in many instances to perform the reaction under temperatures and pressure conditions such that the reaction medium is in a refluxing condition, and if the reaction medium is acetic anhydride, this temperature may be about 139° C.

The proportional amounts of the various ingredients in the reaction are not critical although there are preferred limits which have been found to be desirable. For convenience in handling, it is preferred to have 80 ml. to 200 ml. of reaction medium for every 5 to 10 grams of polyoxymethylene which is being treated. These ratios are desirable with ordinary stirring techniques; however, higher polymer concentrations may be handled with more efficient stirring mechanisms.

The amount of carboxylic acid anhydride which is employed is preferably a large excess over that theoretically needed to complete the reaction, although such an amount is desirable primarily to form a reaction mixture which can be readily stirred. In general, the anhydrides may be present in any amount up to 20 times or more of the weight of the polymer being treated, although this upper limit is based entirely on the fact that it is less economical to use the larger amounts of anhydride, and not on any peculiarities of the reaction. For most embodiments of this invention 8 to 20 times the weight of the polymer constitutes the amount of anhydride which is preferred. The amount of anhydride is given here in terms of weight per unit weight of polyoxymethylene while in the examples the anhydride used has been measured in terms of volume. Since the density of the common anhydrides are reasonably close to 1.0 and since it is preferable to use a large excess of anhydride in the reaction of this invention, it makes relatively little difference whether the amount of anhydride used is eight to twenty times the weight of polymer or 8 ml. to 20 ml. of anhydride per gram of polymer since either variety of measurement will give operable results.

The salt or salt-forming substances which are used in the process of this invention desirably are present in an amount varying from about 0.002% to about 10% or more by weight of the carboxylic acid anhydride, although these values are not meant to be critical limits, since in some embodiments of this invention more or less than these amounts may be employed. In order to obtain a speedy, and yet satisfactorily complete reaction, the amount of the catalyst should preferably be not less than about 0.01% by weight of the anhydride present. It is usually preferable to use less than about 1% by weight of the catalyst for reasons of economy and to facilitate later removal of the catalyst from the polymer by washing. In some cases the amount of catalyst used may exceed the amount which is soluble in the reaction mixture, and this has been found to have no adverse effect on the results, provided that proper steps are taken to wash all of the catalyst out of the polymer following the esterification.

It has been found to be highly desirable that the polymer product which is recovered from the esterification reaction of this process be washed and dried as thoroughly as possible, or otherwise treated to remove all reactants and by-products which might cause degradation of the esterified polymer. Acids or bases, or compounds which are capable of forming acids or bases, should be removed as thoroughly as possible from the polymer after it has been esterified. This removal may be accomplished conveniently by washing the polymer with water or organic solvents such as acetone, drying the recovered polymer, or by other methods known to those skilled in the art. A suggested procedure may be to wash the polymer with acetone while the polymer is in the form of a filter cake which has been prepared by separating the polymer from the original reaction medium. Following the initial washing of the filter cake, the polymer may be washed two or three times with water and reslurried with water in a high speed blender. It may then be refiltered and washed one or two times with water or acetone. If the catalyst is completely dissolved in the reaction medium at the beginning of this process, it may be feasible to remove reactants and by-products by washing with acetone only. It is not intended that this invention should be limited to any particular method of removing impurities absorbed from the reaction medium since any of several well-known procedures may be used to accomplish this purpose.

In the above examples each of the esterified polymers after being washed has been treated with an antioxidant. The particular antioxidants used in these examples are di-beta-naphthyl-p-phenylenediamine and beta-conidendrol. Other antioxidants which may be used include, but are not limited to, phenolic compounds, secondary or tertiary aromatic amines, hydrazines, ureas, and thioureas. The used of an antioxidant does not form a part of this invention but is used merely to protect the polymer from possible effects of oxidation in air until it has been tested to determine its thermal degradation constant or fabricated into useful articles.

The polymers of this invention have essentially the same chemical properties and the same physical properties (with the exception of their improved thermal stability) as polyoxymethylenes made by any of the processes described in the copending applications cited herein. The paramount difference is that the chemical addition of acyl groups, small in number relative to the large number of $CH_2O$ groups present, materially improves the thermal stability of the polymer to such an extent that the polymers of this invention are eminently better suited for use in fabrication methods at high temperatures than are polymers which have not been esterified. The number of acyl groups varies with the polymer which is treated, but the number of acyl groups is so small that in many cases they may not be detectable by infrared analysis, although in the majority of cases, the number of acyl groups is detectable by both infrared analysis and refined techniques of chemical analysis.

The polymers of this invention are highly desirable for the preparation of any shaped article, such as films, fibers, filaments, rods, tubes, sheets, injection-molded articles, and for any general use normally expected of a thermoplastic polymer which is tough and has good thermal stability.

We claim:

1. The process comprising reacting a mixture of a polyoxymethylene, having a number average molecular weight of at least 15,000 and having at least one of the two terminals of the polyoxymethylene chain occupied by a hydroxyl group, 2–20 parts by weight per part of said polyoxymethylene of an anhydride of a saturated, monobasic, carboxylic acid, and 0.002%–10% by weight of said anhydride, of a salt whose cation is an alkali metal and whose anion is the negative ion product obtained by removing a hydrogen atom from an acid having a dissociation constant which is less than $1.8 \times 10^{-4}$ at 25° C., the temperature of the reacting mixture being from 50° C. to the boiling point of the said mixture.

2. The process of claim 1 in which said polyoxymethylene has only one of the two terminals of the polyoxymethylene chain occupied by a hydroxyl group, while the other terminal is occupied by a member of the group consisting of an ether group and a carboxylate group.

3. The process comprising forming a mixture of a polyoxymethylene glycol having both terminals of its polymer chain occupied by hydroxyl groups and having a number average molecular weight of at least 15,000, 2 to 20 parts by weight per part of said polyoxymethylene glycol of an anhydride of a saturated, monobasic, carboxylic acid, and 0.002%–10% by weight of said anhydride, of a salt whose cation is an alkali metal and whose anion is the negative ion product obtained by removing a hydrogen atom from an acid having a dissociation constant which is less than $1.8 \times 10^{-4}$ at 25° C., heating said mixture to a temperature of 50° C. to the boiling point of said mixture for a time sufficient to form a reaction product containing polyoxymethylene dicarboxylate, separating said polyoxymethylene dicarboxylate from substantially all of the remainder of said reaction product and recovering a polyoxymethylene dicarboxylate having a number average molecular weight of at least 15,000, having both terminals of its polymer chain occupied by carboxylate groups corresponding to said carboxylic acid, and having a reaction rate constant for thermal degradation at 222° C. of less than 1% by weight per minute.

4. The process of claim 3 in which said carboxylic acid is saturated, monobasic, aliphatic carboxylic acid of 1–10 carbon atoms.

5. The process of claim 3 in which said salt is an alkali metal acetate.

6. The process which comprises reacting a mixture of polyoxymethylene glycol having both terminals of its polymer chain occupied by hydroxyl groups and having a number average molecular weight of at least 15,000, 2–20 parts of acetic anhydride per part of said polyoxymethylene glycol, and 0.002%–10% by weight of said anhydride of sodium acetate at a reaction temperature of 50° C.–200° C. to form a reaction product containing polyoxymethylene diacetate, acetic anhydride, acetic acid and sodium acetate, separating said polyoxymethylene diacetate from substantially all of the remainder of said reaction product and recovering a polyoxymethylene diacetate having both terminals of its polymer chain occupied by acetate groups, having a number average molecular weight of at least 15,000, and having a reaction rate constant for thermal degradation at 222° C. of less than 0.5% by weight per minute.

References Cited in the file of this patent

UNITED STATES PATENTS 2,734,889   Starr _____ Feb. 14, 1956

OTHER REFERENCES

Walker: Formaldehyde, ACS Monograph #120 (1953), pages 133–137.